United States Patent
Shimamura et al.

(12) 
(10) Patent No.: US 6,265,000 B1
(45) Date of Patent: *Jul. 24, 2001

(54) PROCESS FOR THE PRODUCTION OF CARBONATED ALCOHOLIC BEVERAGES USING KOJI, MALT, AND VARIOUS FERMENTATION MEDIA

(75) Inventors: Kimihiro Shimamura, Otaru; Tadahiko Hozumi, Tokyo; Takashi Sasaki, Otaru, all of (JP)

(73) Assignee: Hokkaido Wine CO, LTD, Otaru (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/326,387

(22) Filed: Oct. 20, 1994

(51) Int. Cl.$^7$ ................................................. C12C 11/00
(52) U.S. Cl. ................................. 426/16; 426/15; 426/13; 426/28; 426/29
(58) Field of Search ............................ 426/13, 15, 16, 426/28, 29

(56) References Cited

U.S. PATENT DOCUMENTS

| | | | | |
|---|---|---|---|---|
| 525,819 | * | 9/1894 | Takamine | 426/13 |
| 538,195 | * | 4/1895 | Hart et al. | |
| 4,358,462 | * | 11/1982 | Takeda | 426/13 |
| 4,514,496 | * | 4/1985 | Yoshizumi et al. | 435/162 |
| 4,684,525 | * | 8/1987 | Plainer et al. | 426/16 |

FOREIGN PATENT DOCUMENTS

| | | | |
|---|---|---|---|
| 17374 | * | 10/1892 | (GB) . |
| 1060681 | * | 3/1967 | (GB) . |
| 57-68779 | * | 4/1982 | (JP) . |
| 68779 | * | 4/1982 | (JP) . |
| 60-87782 | * | 5/1985 | (JP) . |
| 87782 | * | 5/1985 | (JP) . |
| 186273 | * | 9/1985 | (JP) . |
| 60-186273 | * | 9/1985 | (JP) . |
| 585574 | * | 3/1986 | (JP) . |
| 61-58574 | * | 3/1986 | (JP) . |

OTHER PUBLICATIONS

Rose, A.H., Economic Microbiology, vol. 1, Alcoholic Beverages, Academic Press, New York, pp. 443–444, 1977.*
Abstract of Gomi et al, Jap. Pat. No. 35613788.*
Abstract of Ichijima et al, Jap. Pat. No. 404346783.*
C. Papazian, The New Complete Joy of Home Brewing, Avon Books, New York, 1991 pp. 59,92,93,104& 105.*
C. Rhodes, Ed., The Encyclopedia of Beer, Hery Holt & Co., New York, 1995, pp 282–83.*
The Practical Brewer, MBAA, Madison, Wisc. 1977, p. 40.*
Underkofler et al., Industrial & Engineering Chem, Oct., 1946, pp. 980–985.*

* cited by examiner

Primary Examiner—Curtis E. Sherrer
(74) Attorney, Agent, or Firm—Oblon, Spivak, McClelland, Maier & Neustadt, P.C.

(57) ABSTRACT

A process is provided for the production of a novel carbonated alcoholic beverage having a characteristic flavor. A mixture of malt and an amylaceous raw material is added with a koji which has been prepared using a mold selected from the group consisting of yellow Aspergillus and white Aspergillus. The mixture is then saccharified by the koji to obtain a saccharified malt liquor. An output from production of an alcoholic beverage, which is of a type different from the saccharified malt liquor, is incorporated in the saccharified malt liquor. Prior to the incorporation of the output in the saccharified malt liquor, a hop flavor can be added to the saccharified malt liquor by adding hops to the saccharified malt liquor and heating the hops and the saccharified malt liquor.

26 Claims, No Drawings

PROCESS FOR THE PRODUCTION OF CARBONATED ALCOHOLIC BEVERAGES USING KOJI, MALT, AND VARIOUS FERMENTATION MEDIA

BACKGROUND OF THE INVENTION a) Field of the Invention

This invention relates to the production of a novel beer-like sparkling alcoholic beverage which may preferably have a sake flavor or a fruit wine flavor. As a general trend of these days, alcoholic beverages having a high alcohol content and called "hard liquors" are not favored and as typified by the popularity of beer, people incline toward carbonated refreshing alcoholic beverages having a low alcohol content.

The novel alcoholic beverage according to the present invention has both a soft but characteristic flavor and refreshing taste, and is expected to fully satisfy the taste or preference of contemporary consumers. The alcoholic beverage according to the present invention uses, as primary raw materials, an amylaceous (i.e., starchy) raw material such as barley and/or rice and optionally a fruit such as grape or apple. Industrial practice of the present invention is therefore believed to result in a substantial contribution for the stabilization of the basis of agriculture, so that the significance of the present invention in the society is believed to be extremely high.

b) Description of the Related Art

The conventional brewing includes the steps of malting, mashing, preparing wort, wort boiling with hops, and fermentation. In the wort boiling step, a wort is boiled with hops to prepare a bittered wort. After the bittered wort is cooled and filtered, a brewer's yeast is added to the bittered wort for fermentation.

In Japan, beer is stringently controlled under the Liquor Tax Act. Limitations are hence imposed on the usable raw materials and the weight percentage of malt in the raw materials. Further, its production must be carried out by simply adding a brewer's yeast, which has been obtained by axenic culture, to a wort. The flavor of the beer so obtained naturally results in a non-characteristic one without any exceptions. It has therefore been desired to develop a novel beer-like sparkling alcoholic beverage having flavors of plural alcoholic beverages of different kinds.

Sake is a typical traditional alcoholic beverage in Japan and its production includes the steps of preparation of koji, molding rice, as a culture of Aspergillus oryzae on steamed rice, incubation of a mixture of steamed rice, water and koji in a small scale to obtain a preculture "moto" as a starter or a seed mash, repeating addition of a mixture of koji, steamed and then cooled rice and water 3–4 times to the preculture for main fermentation in a large scale. After the main fermentation, the mixture is then pressed and filtered through a press filter. The filtrate is allowed to remain standstill for clarification by precipitation of insoluble materials, and the supernatant is recovered, pasteurized and stored for maturation.

The "moto" is a traditional Japanese word for the preculture as a seed mash in the Sake production process. Among various types of the moto, "kimoto", "yamahaimoto" and "sokujomoto", which are also traditional Japanese words, can be exemplified.

The "kimoto" is a preculture prepared by a traditional process which includes the steps of i. preparing a mixture of steamed rice, water and koji in each of two or eight small and shallow vats having the same volume, ii. kneading each mixture into a smooth paste, putting the mixtures from the small and shallow vats together into a big vat, and iii. allowing the mixture to ferment to obtain the kimoto.

The yamahaimoto is prepared by the "yamahai process" as a modified process of the above process for the kimoto. In this modified process, the "yamaoroshi step" consisting of the above steps i and ii is omitted and the mixture of steamed rice, water and koji is directly prepared in a big vat.

In the methods of producing the kimoto and yamahaimoto, wild lactic acid bacteria first grow to reduce pH and then yeasts grow.

The sokujomoto is prepared by the lactic-acid-added quick fermentation process as a modified process of the above yahai process. In this modified process, lactic acid and yeast are added to the mixture of steamed rice, water and koji. The mixing of the raw materials is carried out at 18–20° C.

In the process for the production of the preculture moto, rice starch is converted into fermentable sugar by saccharification in the presence of Aspergillus oryzae and the fermentable sugar is converted into ethyl alcohol by yeast. As yeast, either natural yeasts (wild yeasts) in the atmosphere in which vats are placed or pure-cultured yeasts can be used. In general, natural yeasts which tend to enter the vats from the atmosphere are used in the production of the kimoto and the yamahaimoto, i.e., spontaneous fermentation is carried out. A pre-cultured yeast is used for the production of the sokujomoto.

Wine production includes the steps of preparation of a fruit juice and fermentation of the juice. Yeasts are spontaneously inoculated into the fruit juice. Alternatively, a seed culture of a wine yeast is added to the fruit juice. In the spontaneous fermentation, wild yeasts living on the fruit per se or its leaves or branches are mainly used.

SUMMARY OF THE INVENTION

An object of the present invention is therefore to provide a process for the production of such a novel beer-like sparkling alcoholic beverage having flavors of plural alcoholic beverages of different kinds.

As a result of extensive research, the present inventor has found that a novel beer-like sparkling alcoholic beverage having, as an additional flavor, the flavor of an alcoholic beverage other than beer, for example, the flavor of sake or a fruit wine (or a wine or cider), can be produced by adding in the course of production of beer an output from production of the alcoholic beverage other than beer, for example, a starter or a seed mash—which is under fermentation by using a yellow koji mold (yellow Aspergillus) for the brewery of the sake—or a must for the fruit wine (wine or cider) which is under active fermentation.

In one aspect of the present invention, there is thus provided a process for the production of a novel beer-like sparkling alcoholic beverage having a characteristic flavor, which comprises:

adding koji, which has been prepared using a mold selected from the group consisting of yellow koji molds and white-koji molds (white Aspergillus), to a malt to obtain a saccharified malt liquor; and incorporating an output from production of an alcoholic beverage, which is of a type different from the saccharified malt liquor, in the saccharified malt liquor.

Prior to the incorporation of the output in the saccharified malt liquor, it is possible to add hops to the saccharified malt liquor and then heat the hops and the saccharified malt liquor so that a hop flavor can be extracted in the saccharified malt liquor.

According to the present invention, the malt is saccharified by the combined action of a saccharase in the malt and a saccharase in the koji so that the saccharified malt liquor is obtained. This saccharified malt liquor is then fermented by an output from production of the alcoholic beverage of the type different from the saccharified malt liquor, for example, moto (i.e., seed mash) of sake or a must of a fruit wine, whereby a beer-like sparking alcoholic beverage having a characteristic flavor can be obtained.

The present invention has therefore made it possible to produce a novel beer-like sparkling alcoholic beverage imparted with an additional flavor of a different alcoholic beverage such as a sake flavor or a fruit juice or wine flavor. Such a beer-like sparkling alcoholic beverage has not been available before the present invention.

The term "output" as used herein means for example an intermediate product of production of an alcoholic beverage which is of a type different from the saccharified malt liquor. The output can be, for example, a moto obtained by a sake brewing process selected from the group consisting of the original and traditional process, the yamhai process and the lactic-acid-added quick fermentation process, or a mash obtained using the moto as a starter; or a must of a fruit juice under fermentation by a fruit wine yeast.

A fruit juice may be added to the saccharified malt liquor.

DETAILED DESCRIPTION OF THE INVENTION AND PREFERRED EMBODIMENTS

A process for the production of a beer-like sparkling alcoholic beverage having a characteristic flavor according to the present invention, which comprises the steps of:

I. adding koji, which has been prepared using a mold selected from the group consisting of yellow Aspergillus and white Aspergillus, to a malt in water to saccharify the malt into a saccharified malt liquor as a wort, and II. incorporating a yeast-containing output from production of an alcoholic beverage other than beer into the saccharified malt liquor to ferment so as to obtain the beer-like sparkling alcoholic beverage.

Another process of the present invention comprises the steps of:

A. adding "koji", which has been prepared using a mold selected from the group consisting of yellow Aspergillus and white Aspergillus, to a malt in water to saccharify the malt into a saccharified malt liquor as a wort;

B. incorporating an output from production of an alcoholic beverage other than beer into the saccharified malt liquor to obtain a mixture to be fermented; and C. inoculating the mixture to be fermented with yeast to ferment the mixture so as to obtain the beer-like alcoholic beverage.

The koji used in the above steps I and A can be prepared by any conventional processes by inoculating steamed rice with yellow Aspergillus or white Aspergillus and incubating the mixture, for example, at 30–42° C. for about two days.

As the yellow Aspergillus and the white Aspergillus, seed Aspergillus publicly available or commercially sold for the production of sake can be used. The mixing ratio of the koji to the malt is not restricted to any particular value. The mixing ratio may be selected, for example, in view of a flavor desired for the final product. For example, when a beer flavor is desired for the final product, the weight ratio of the koji to the malt (koji/malt) may be less than 1/10. When a new flavor other than beer flavor is desired, the weight ratio (koji/malt) may be 1/10 or greater.

As the yeast used in the step C, any publicly available or commercially sold yeasts for production of beer can be used. For example, Catalogue Nos. 3-401 and 3-403 available from "The Cellar", 1441 Greenwod Ave. N., Seattle Wash. 98133, U.S.A. can be used.

An amylaceous raw material may be added to the mixture to be saccharified. As the amylaceous raw materials, cereals such as rice, corn, kaoliang and potato; starches; and sugars may be used. The cereals may be used in a ground form and then used. A mixture of two or more of these materials can also be used, and a preferable mixture consists of corn, rice and potato starch at a weight ratio of 1:1:1, and this mixture can be added to dried malt preferably at a ratio of 40–50 g of the mixture to 100 g of the dried malt. The amylaceous material can be mixed with the malt either before the beginning of the saccharification or during the saccharification using the mixture of the malt and the koji.

As described above, the "output" means a material(s) or an intermediate product(s) which are used or produced for or during processes for producing an alcoholic beverage other than beer. The outputs containing yeast(s) include, for example, preculture "moto" as a seed mash in sake brewing process and any musts in wine production. Any motoes such as "kimoto", "yamahaimoto" and "sokujomoto" which can be prepared by conventional processes can be used. Spontaneous fermentation or fermentation using pure yeast culture can be used for production of the moto. As the pure yeast culture, any publicly available or commercially sold yeast pure cultures for sake production can be used. Examples of the yeast pure cultures include Kyokai Nos. 6, 7, 9–13. 601, 701, 901 and 1001 available from the Nippon Jyozo Kyokai (Japanese Brewing Association).

When a moto is used as the output, for example, the moto can preferably be mixed with the saccharified malt liquor at a ratio of 5–10 liters of the moto to 100 liters of the saccharified malt liquor.

The must may be a juice with yeast under fermentation. As the raw materials for preparation of the juice, any fruits containing fermentable sugar such as grapes, apples, peaches, pears, persimmon fruits (kaki), strawberries and loquats can be used. A mixed juice of two or more fruits can also be used.

The juice and the must can be prepared by conventional processes. A must under active fermentation is preferred. Spontaneous fermentation or fermentation using a yeast pure culture can be used. As the yeast pure culture, any publicly available or commercially sold yeast pure cultures can be used. Examples of the yeast pure cultures include Kyokai Nos. 1, 3 and 4 available from the Nippon Jyozo Kyokai; Catalogue Nos. 12-201, 12-205, 12-207, 12-209, 12-211 and 12-213 available from the Cellar; SIHA Aktiv Hehe-3 available from E. Begerrow GmbH & Co (Germany); and U vaferm CM available form DANSTAR FERMENT (Switzerland).

When the must is used as the output, the mixing ratio is not restricted to any particular value. The must may be mixed, for example, with the saccharified malt liquor at a ratio of 5–100 liters of the must to 100 liters of the saccharified malt liquor.

As a yeast-free output(s) usable in the above step B, any one of the above fruit juices or a mixed juice of two or more fruits can be used. Their mixing ratio is not restricted to any particular value. For example, the juice or the mixed juice may be mixed with the saccharified malt liquor at a ratio of 10–100 liters of the juice or the mixed juice to 100 liters of the saccharified malt liquor.

One of characteristic features of the present invention resides in the saccharifying method. Different from beer, the saccharification of the amylaceous raw material is conducted under the combined action of malt and a mold rice or barley with a yellow Aspergillus or a white Aspergillus proliferated thereon. The flavor of hops is imparted to the saccharified malt liquor so obtained, so that a "wort" is prepared for the production of the beer-like sparking alcoholic beverage additionally having a flavor different from beer. The term "wort" as used herein therefore means not only such a saccharified malt liquor but also a hop-flavored saccharified malt liquor obtained in the above-described manner.

Another characteristic feature of the present invention resides in the fermentation step. In brewing beer, a wort which has been separated from the spent grains such as malt subsequent to the saccharification (mashing) step is added with hops and then boiled. The wort with the flavor of hops extracted therein is cooled and then filtered to obtain a bittered wort. The wort is pitched (i.e., added) with a brewer's yeast, followed by fermentation to obtain beer. In the present invention, on the other hand, the fermentation step has been completely modified. For example, a moto obtained by a sake brewing process such as the original and traditional process, the yamahai process and the lactic-acid-added quick fermentation process, or a mash obtained using the moto as a starter (in other words, a seed mash) is added to a wort to ferment the latter, whereby the pH of the wort is lowered by lactic acid (which has already been formed and contained in the moto) and, while allowing the fermentation to stably proceed, a beer-like sparking alcoholic beverage imparted with a sake flavor is produced. As an alternative, a must—which has been obtained by actively fermenting grape juice, apple juice or another fruit juice with a yeast until the yeast fully proliferated—is added to a wort, followed by fermentation to obtain a beer-like sparkling alcoholic beverage imparted with a wine or cider flavor.

A fruit juice may be simply added to the wort as described above.

As noted above, the present invention is different from the conventional brewing in a) the additional use of koji for the saccharification of the malt and;

b) the incorporation of an output(s), i.e., a material(s) or an intermediate product(s) which are used or produced for or during processes for production of an alcoholic beverage (such as Sake or fruit wine) other than beer; in order to impart the characteristic flavor to the beer-like alcoholic beverage.

EXAMPLE 1

In a room having a structure and an equipment system to permit control of temperature and moisture, a bed was set for preparation of koji.

Rice was steamed and cooled to a temperature between 34 and 36° C. After the room was sterilized, the steamed rice was spread on the bed in the room and agitated to further cool it to a temperature between 30 and 33° C. Then, a commercially sold seed culture of yellow Aspergillus for production of koji was mixed at a ratio of 100 kg of rice to 100 g of the seed culture. The mixture was then treated according to a method publicly known for the production of koji.

First, the mixture was formed into a heap on the bed and covered with a cloth sheet. The temperature of the heap was maintained in the above range and the moisture in the room was controlled to avoid drying of the mixture. About 10 hours later, the heap was leveled down and mixed. Then, the mixture was again formed into a heap and covered with a cloth sheet.

Twelve hours later, the mixture was distributed in small boxes, respectively, and the boxes were stacked one over the other. The mixture was left over, while the temperature of the mixture in each box was controlled between 34 and 36° C. by occasionally mixing the mixture or changing the positions of the boxes. Upon an elapsed time of about 43 hours from the distribution of the mixture in the boxes, a rice koji, molding rice, was obtained.

EXAMPLE 2

The procedure of Example 1 was repeated except that steamed barley and white Aspergillus were used instead of the steamed rice and the yellow Aspergillus, respectively to prepare a barley koji.

EXAMPLE 3

Steamed rice, water and the rice koji prepared in Example 1 were charged in a small and shallow vat (weight ratio; steamed rice:water:rice koji=96:170:45) at room temperature. The temperature of the mixture was controlled at 8° C. by using cooled water. The resulting mixture was then treated according to a method publicly known for the production of kimoto.

First, the mixture was allowed to remain standstill for about 10 hours, and was then mixed by oars. The mixture was left over approximately for additional 1.5 days with occasional mixing at an interval of 5–6 hours to mash particles in the mixture to obtain mash. During this stage, the temperature of the mixture was controlled below 10° C., preferably at 6–7° C.

The mixture in the mash form was put together into a big vat and further allowed to remain standstill, and then occasionally heated so that the temperature gradually arose to about 15° C. In this stage, wild lactic acid bacteria were allowed to grow so that the pH of the mixture dropped. After the heating step, a commercially sold seed yeast was added to the mixture, and the mixture was then heated occasionally for 1 day to raise its temperature to 17– 19° C. to permit growth of yeast. The temperature of the mixture was further raised to and then maintained at 20–24° C. for 8–10 hours. Then, the mixture was allowed to remain standing for 3 days to obtain a kimoto having an acidity of 10.0–11.5 and an alcohol content of 9–11%. The resulting kimoto was then maintained at 10° C. for 15 days for its use.

EXAMPLE 4

A mixture of steamed rice, water and the koji was prepared in a big vat in the same manner as Example 3. The mixture was then treated according to a method publicly known for the production of yamahaimoto.

First, the mixture was left over for about 10 hours with occasional mixing by oars. The mixture was then left over for additional 5 days with occasional mixing at an interval of 5–9 hours. During this stage, the temperature of the mixture was controlled below 10° C., preferably at 6–7° C.

The mixture was then occasionally heated to gradually raise its temperature to about 15° C. over 6 days. In this stage, wild lactic acid-producing bacteria were allowed to grow so that the pH of the mixture dropped. After the heating step, a commercially sold seed yeast was added to the mixture, and the mixture was then heated occasionally for 1 day to raise its temperature to 17–19° C. to permit growth of the yeast. The temperature of the mixture was then raised further to and maintained at 20–24° C. for 8–10 hours. Then, the mixture was allowed to remain standing for 3 days to obtain a yamahaimoto. having an acidity of 10.0–11.5 and an alcohol content of 9–11%. The resulting yamahaimoto was then maintained at 10° C. for 15 days for its use.

EXAMPLE 5

The rice koji prepared in Example 1 and water of a temperature between 10 and 12° C. were mixed at a ratio of 35 kg of the rice koji to 115 liters of the water. A 75% lactic acid solution (720 ml) and a commercially sold yeast were added further to the mixture to obtain a water-koji mixture. The ratio of the lactic acid solution to the water was 800 ml to 1 liter.

Steamed rice and the water-koji mixture were then mixed at a ratio of 35 kg of the rice koji to 70 kg of the steamed rice. The temperature of the mixture thus obtained was controlled at about 20° C. by using hot steamed rice. The mixture was left over and 3 hours later, the mixture was mixed by oars. Then, the mixture was cooled to below 10° C., preferably 8° C. in a day. After the cooling, the mixture was then heated occasionally to gradually raise its temperature to 14° C. over 6 days, and then allowed to remain standing at room temperature for 5 days, in which the temperature of the mixture rose to and remained at about 22° C. by growth of the yeast. The mixture was then cooled gradually to about 8° C. in 2 days and the mixture was then kept at that low temperature for 3 days to obtain a sokujo-moto having an acidity of 7–7.5 and an alcohol content of 12%.

EXAMPLE 6

Dry malt (10 kg) was placed in a saccharification (mashing) tank, followed by the addition of 80 l of warm water of 45–50° C. and 1 kg of the rice koji prepared in Example 1. The resulting mixture was held at 45° C. for 5 hours so that saccharification (mashing) was conducted. The resulting saccharified liquor (wort) is added with 10 kg of a 20% starch solution which had been steamed at 15 kg/cm$^2$ for 15 minutes. After the resultant mixture was held at 70–75° C. for 1 hour, 100 g of hops were added in four portions. The mixture so obtained was then rapidly cooled to 10° C. through a heat exchanger, whereby 90 l of a bittered wort with a hop flavor extracted therein were obtained. One liter of a moto, which had been prepared using a sake yeast in accordance with the "yamahai process" in Example 4 was added to 20 l of the bittered wort, followed by fermentation at temperatures below 10° C. for 40 days so that a novel beer-like sparkling alcoholic beverage having a sake flavor was obtained.

EXAMPLE 7

Dry malt (10 kg) was added with 70 l of warm water of 50° C. and 1 kg of the barley koji prepared in Example 2, followed by saccharification (mashing) at 50–55° C. for 8 hours. Ten kilograms of a 30% starch solution, which had been prepared under heat, were added to the wort so obtained. After the resultant mixture was held at 70–75° C. for 1 hour, 150 g of hops were added. The mixture so obtained was then rapidly cooled to a temperature below 10° C., whereby 70 l of a bittered wort were obtained. Ten liters of a wine must, which had been obtained by inoculating grape juice with a commercially sold wine yeast and fermenting the grape juice at 15° C. for 1 week, were added to 10 l of the bittered wort. Fermentation was continued further at temperatures below 10° C. for 6 weeks so that a novel beer-like sparking alcoholic beverage having a wine flavor was obtained.

EXAMPLE 8

Apple juice (10 l) was added to 10 l of the bittered wort which had been obtained in Example 7. The resulting mixture was inoculated with a commercially sold brewer's yeast and was allowed to ferment at 5–7° C. for 5 weeks, so that a beer-like sparking alcoholic beverage having an apple wine flavor was obtained.

EXAMPLE 9

The beer-like sparkling alcoholic beverage prepared any one of Examples 6–8 was kept cool at a temperature of 0–5° C. to coagulate a part of proteins and avoid release of carbon dioxide ($CO_2$) from the beverage in order to maintain the quality of the product. Thereafter, the beer-like sparkling alcoholic beverage was filtered through a press filter and stored in barrels or bottles at about 5° C.

What is claimed as new and desired to be secured by Letters Patent of the United States is:

1. A process for producing an alcoholic beverage, comprising:
   (A) adding a koji to a malt containing enzymes, to obtain a saccharified malt liquor as a wort by the combined action of the koji and the malt enzymes,
      wherein the koji is prepared by a process comprising combining steamed rice or steamed barley with yellow Aspergillus or white Aspergillus to form a mixture, followed by maintaining the mixture for sufficient time to form the koji;
   (B) incorporating a moto containing a sake yeast into the saccharified malt liquor at a ratio of 5 to 10 volume parts of the moto to 100 volume parts of the saccharified malt liquor to obtain a mixture,
      wherein the moto is obtained by a process comprising:
         (i) incubating a mixture comprising steamed rice, koji and water at a temperature below 10° C. to obtain a mash,
         (ii) allowing lactic acid-producing bacteria to grow in the mash,
         (iii) adding a sake yeast to the mash, and
         (iv) allowing the sake yeast to grow in the mash at a temperature from 17 to 24° C., to produce the moto; and
   (C) fermenting the mixture.

2. A process as claimed in claim 1, wherein the moto is selected from the group consisting of kimoto and yamahaimoto.

3. A process as claimed in claim 1, wherein the saccharified malt liquor is mixed with hops and boiled to extract a hop flavor into the saccharified malt liquor before incorporating the moto.

4. A process as claimed in claim 1, wherein an amylaceous raw material other than the koji and the malt is added to the mixture of the koji and the malt before the saccharification or during the saccharification.

5. A process as claimed in claim 4, wherein the amylaceous raw material is a cereal.

6. A process as claimed in claim 4, wherein the amylaceous raw material is a starch.

7. A process as claimed in claim 1, wherein a sugar is added to the koji and the malt before the saccharification or during saccharification.

8. A process as claimed in claim 1, wherein the koji is added to the malt at a ratio of one or less weight part of the koji to ten weight parts of the malt.

9. A process as claimed in claim 8, wherein the koji added to the malt at a ratio of one weight part of the koji to ten weight parts of the malt.

10. A process for producing an alcoholic beverage, comprising:
  (A) adding a koji to a malt to obtain a saccharified malt liquor as a wort by the combined action of the koji and the malt enzymes,
    wherein the koji is prepared by a process comprising combining steamed rice or steamed barley with yellow Aspergillus or white Aspergillus to form a mixture, followed by maintaining the mixture for sufficient time to form the koji;
  (B) heating the saccharified malt liquor to inactivate saccharifying enzymes of the koji in the saccharified malt liquor;
  (C) incorporating a fruit wine must containing a wine yeast into the heat-treated saccharified malt liquor at a ratio of 5 to 100 volume parts of the fruit wine must under active fermentation to 100 volume parts of the saccharified malt liquor to obtain a mixture; and
  (D) fermenting the mixture.

11. A process as claimed in claim 10, wherein the saccharified malt liquor is mixed with hops and boiled to extract a hop flavor into the saccharified malt liquor before incorporating the fruit wine must.

12. A process as claimed in claim 10, wherein an amylaceous raw material other than the koji and the malt is added to the koji and the malt before the saccharification or during the saccharification.

13. A process as claimed in claim 12, wherein the amylaceous raw material is a cereal.

14. A process as claimed in claim 12, wherein the amylaceous raw material is a starch.

15. A process as claimed in claim 10, wherein a sugar is added to the koji and the malt before the saccharification or during saccharification.

16. A process as claimed in claim 10, wherein the koji is added to the malt at a ratio of one or less weight part of the koji to ten weight parts of the malt.

17. A process as claimed in claim 16, wherein the koji is added to the malt at a ratio of one weight part of the koji to ten weight parts of the malt.

18. The process of claim 1, wherein the saccharified malt liquor is heated at a temperature of between 70 and 75° C.

19. A process for producing an alcoholic beverage, comprising:
  (A) adding a koji to a malt containing enzymes, to obtain a saccharified malt liquor as a wort by the combined action of the koji and the malt enzymes,
    wherein the koji is prepared by a process comprising combining steamed rice or steamed barley with yellow Aspergillus or white Aspergillus to form a mixture, followed by maintaining the mixture for sufficient time to form the koji;
  (B) incorporating a sokujomoto containing a sake yeast into the saccharified malt liquor at a ratio of 5 to 10 volume parts of the moto to 100 volume parts of the saccharified malt liquor to obtain a mixture; and
  (C) fermenting the mixture.

20. A process as claimed in claim 19, wherein the saccharified malt liquor is mixed with hops and boiled to extract a hop flavor into the saccharified malt liquor before incorporating the moto.

21. A process as claimed in claim 19, wherein an amylaceous raw material other than the koji and the malt is added to the mixture of the koji and the malt before the saccharification or during the saccharification.

22. A process as claimed in claim 21, wherein the amylaceous raw material is a cereal.

23. A process as claimed in claim 21, wherein the amylaceous raw material is a starch.

24. A process as claimed in claim 19, wherein a sugar is added to the koji and the malt before the saccharification or during saccharification.

25. A process as claimed in claim 19, wherein the koji is added to the malt at a ratio of one or less weight part of the koji to ten weight parts of the malt.

26. A process as claimed in claim 25, wherein the koji added to the malt at a ratio of one weight part of the koji to ten weight parts of the malt.

* * * * *